US010012966B2

(12) United States Patent
Nakayama (10) Patent No.: US 10,012,966 B2
(45) Date of Patent: Jul. 3, 2018

(54) EQUIPMENT MANAGEMENT SYSTEM, EQUIPMENT MANAGEMENT APPARATUS, AND EQUIPMENT MANAGEMENT METHOD (71) Applicant: KYOCERA Corporation, Kyoto-shi, Kyoto (JP)

(72) Inventor: Taku Nakayama, Yamato (JP)

(73) Assignee: KYOCERA Corporation, Kyoto (JP)

( * ) Notice: Subject to any disclaimer, the term of this patent is extended or adjusted under 35 U.S.C. 154(b) by 232 days.

(21) Appl. No.: 14/763,763

(22) PCT Filed: Jan. 21, 2014

(86) PCT No.: PCT/JP2014/051059
§ 371 (c)(1),
(2) Date: Jul. 27, 2015

(87) PCT Pub. No.: WO2014/119420
PCT Pub. Date: Aug. 7, 2014

(65) Prior Publication Data
US 2015/0370231 A1    Dec. 24, 2015

(30) Foreign Application Priority Data
Jan. 29, 2013   (JP) ................................. 2013-014476

(51) Int. Cl.
*G05B 15/02*    (2006.01)
*H04W 4/00*    (2018.01)
(Continued)

(52) U.S. Cl.
CPC .............. *G05B 15/02* (2013.01); *H02J 13/00* (2013.01); *H04W 4/80* (2018.02)

(58) Field of Classification Search
CPC ......... G05B 15/02; H04W 4/008; H02J 13/00
See application file for complete search history.

(56) References Cited

U.S. PATENT DOCUMENTS 6,178,362 B1 * 1/2001 Woolard ................ G01R 22/00
  700/28
6,636,893 B1 * 10/2003 Fong ...................... G01R 22/00
  370/252

(Continued)

FOREIGN PATENT DOCUMENTS

EP    2477308 A1    7/2012
JP    2011-101535 A    5/2011
(Continued)

OTHER PUBLICATIONS

Extended European Search Report dated Jun. 23, 2016 issued by the European Patent Office for Counterpart European Application No. 14 74 5484.
(Continued)

*Primary Examiner* — Charles Kasenge
(74) *Attorney, Agent, or Firm* — Procopio Cory Hargreaves and Savitch LLP (57)    ABSTRACT An EMS (30) is equipped with a control unit (31) for obtaining a first measurement value which indicates an operating state of an apparatus (11) at a predetermined time point and at least one second measurement value which indicates an operating state of the apparatus (11) at a time point earlier than the predetermined time point. The control unit (31) calculates a first reference value, which indicates a reference for the operating state of the apparatus (11), by using the second measurement value and determines the presence/absence of an anomaly of the apparatus (11) on the basis of a comparison result between the first measurement value and the first reference value.

4 Claims, 7 Drawing Sheets (51) Int. Cl.
*H02J 13/00* (2006.01)
*H04W 4/80* (2018.01)

(56) References Cited

U.S. PATENT DOCUMENTS

| | | | | |
|---|---|---|---|---|
| 7,002,463 B2 * | 2/2006 | Wakabayashi | ..... | G08B 21/0423 340/522 |
| 8,172,154 B1 * | 5/2012 | Figley | ......... | F24F 11/0015 165/223 |
| 8,190,395 B2 * | 5/2012 | Peleg | ......... | H02J 13/0062 702/182 |
| 8,504,325 B2 * | 8/2013 | Kerrigan | ...... | H02J 13/0062 702/182 |
| 8,738,328 B2 * | 5/2014 | Herzig | ........ | H02J 13/0062 702/182 |
| 2010/0219983 A1 * | 9/2010 | Peleg | ......... | H02J 13/0062 340/870.17 |
| 2011/0047418 A1 * | 2/2011 | Drees | ......... | G05B 15/02 714/57 |
| 2011/0088000 A1 * | 4/2011 | Mackay | ........ | G06T 19/00 715/853 |
| 2012/0016528 A1 | 1/2012 | Raman | | |
| 2012/0022700 A1 * | 1/2012 | Drees | ......... | G05B 15/02 700/276 |
| 2012/0173177 A1 * | 7/2012 | Nishiyama | ..... | H02J 13/0017 702/62 |
| 2012/0259583 A1 | 10/2012 | Noboa | | |
| 2013/0085614 A1 * | 4/2013 | Wenzel | ......... | F24F 11/006 700/277 |
| 2014/0172182 A1 * | 6/2014 | Subbotin | ....... | H02J 3/383 700/291 |

FOREIGN PATENT DOCUMENTS

| | | |
|---|---|---|
| JP | 2012-029536 A | 2/2012 |
| JP | 2012-134837 A | 7/2012 |
| WO | 2012/144629 A1 | 10/2012 |

OTHER PUBLICATIONS

International Search Report dated Feb. 18, 2014 issued for International Application No. PCT/JP2014-051059.
Office Action dated May 2, 2017 issued in counterpart Japanese Application No. 2013-014476.

* cited by examiner

| EQUIPMENT IDENTIFICATION NUMBER | OPERATION CONDITIONS | | | FIRST REFERENCE VALUE |
|---|---|---|---|---|
| EQUIPMENT 1 | 1 | HEATER TEMPERATURE a1 AIR VOLUME b1 | | 1000W |
| | 2 | HEATER TEMPERATURE a2 AIR VOLUME b2 | 900W | 800W |
| | ⋮ | ⋮ | | ⋮ |
| EQUIPMENT 2 | 1 | HEATER TEMPERATURE a1 AIR VOLUME b1 | | 1010W |
| | 2 | HEATER TEMPERATURE a2 AIR VOLUME b2 | 950W | 810W |
| | ⋮ | ⋮ | | ⋮ |

| EQUIPMENT TYPE | SECOND REFERENCE VALUE |
|---|---|
| AIR CONDITIONER 1 | 900W |
| AIR CONDITIONER 2 | 950W |

FIG. 8

| EQUIPMENT TYPE | | OPERATION CONDITIONS | SECOND REFERENCE VALUE |
|---|---|---|---|
| AIR CONDITIONER 1 | 1 | HEATER TEMPERATURE a1 AIR VOLUME b1 | 1000W |
| | 2 | HEATER TEMPERATURE a2 AIR VOLUME b2 | 800W |
| | ⋮ | ⋮ | ⋮ |
| AIR CONDITIONER 2 | 1 | HEATER TEMPERATURE a1 AIR VOLUME b1 | 1010W |
| | 2 | HEATER TEMPERATURE a2 AIR VOLUME b2 | 810W |
| | ⋮ | ⋮ | ⋮ |

FIG. 9

| EQUIPMENT TYPE | OPERATION CONDITIONS | | INSTALLATION ENVIRONMENT | SECOND REFERENCE VALUE |
|---|---|---|---|---|
| AIR CONDITIONER 1 | 1 | HEATER TEMPERATURE a1 AIR VOLUME b1 | X | 1005W |
| | | | Y | 1100W |
| | | | Z | --- |
| | | | ⋮ | ⋮ |
| | 2 | HEATER TEMPERATURE a2 AIR VOLUME b2 | X | 800W |
| | | | Y | --- |
| | | | ⋮ | ⋮ |
| | ⋮ | ⋮ | ⋮ | ⋮ |
| AIR CONDITIONER 2 | 1 | HEATER TEMPERATURE a1 AIR VOLUME b1 | X | 1020W |
| | | | Y | 1200W |
| | | | Z | --- |
| | | | ⋮ | ⋮ |
| | 2 | HEATER TEMPERATURE a2 AIR VOLUME b2 | X | 950W |
| | | | Y | --- |
| | | | ⋮ | ⋮ |
| | ⋮ | ⋮ | ⋮ | ⋮ |

//PATENT US 10,012,966 B2

EQUIPMENT MANAGEMENT SYSTEM, EQUIPMENT MANAGEMENT APPARATUS, AND EQUIPMENT MANAGEMENT METHOD

TECHNICAL FIELD

The present invention relates to an equipment management system, an equipment management apparatus, and an equipment management method for the management of equipment installed in a consumer's facility of grid power.

BACKGROUND ART

In recent years, distributed power sources, such as a photovoltaic power generator, a storage battery apparatus, and a fuel cell, are being introduced in consumer's facilities of grid power. An equipment management apparatus that manages loads and distributed power sources (hereinafter, referred to as "equipment") installed in the consumer's facilities are also known. An equipment management apparatus especially for homes is referred to as a home energy management system (HEMS).

The equipment management apparatus monitors numerical values indicating an operation state of the equipment (e.g., power consumption), and determines an occurrence or a non-occurrence of an error of the equipment. Specifically, the equipment management apparatus determines an occurrence or a non-occurrence of an error of the equipment based on a comparison result between a measured value and a reference value of power consumption using, for example, a power consumption value of the equipment on a catalog or the like issued by a manufacturer as the reference value (see, for example, Patent Literature 1).

CITATION LIST

Patent Literature

[Patent Literature 1] Japanese Patent Application Publication No. 2012-134837

SUMMARY OF INVENTION

However, since different users use the equipment in different ways, the measured value of power consumption of the equipment can deviate from the reference value on a catalog or the like. In that case, if the equipment management apparatus uses the reference value on the catalog or the like, there is possibility that an error of the equipment is not detected accurately.

Then, an object of the present invention is to provide an equipment management system, an equipment management apparatus, and an equipment management method capable of detecting an error of equipment accurately.

An equipment management system according to a first feature includes: an equipment management apparatus that manages equipment provided in a consumer's facility, wherein the equipment management apparatus comprises a first controller that acquires a first measured value indicating an operation state of the equipment at first timing and a second measured value indicating an operation state of the equipment at second timing prior to the first timing; the first controller calculates a first reference value indicating a standard of the operation state of the equipment using the second measured value; and the first controller determines an occurrence or a non-occurrence of an error of the equipment based on a comparison result between the first measured value and the first reference value.

In the first feature, the first controller calculates the first reference values for each of operation conditions of the equipment; and the first controller determines the occurrence or the non-occurrence of the error of the equipment based on a comparison result between the first measured value and the first reference value corresponding to a predetermined operation condition, when the first measured value is measured during an operation of the equipment according to the predetermined operation condition.

In the first feature, the equipment management system includes: a higher-order management apparatus that manages a plurality of equipment management apparatuses, wherein the higher-order management apparatus comprises a second controller that acquires, about each of a plurality of equipments managed by any of the plurality of equipment management apparatuses, a third measured value indicating the operation state at second timing, and a fourth measured value indicating an operation state acquired at timing prior to the second timing; the second controller calculates a second reference value indicating a standard of the operation state for each equipment type of a plurality of equipments using the fourth measured value regarding the equipment of the same equipment type among a plurality of equipments; and the second controller determines an occurrence or a non-occurrence of an error of the predetermined equipment based on a comparison result between the third measured value about the predetermined equipment included in the plurality of equipments and the second reference value corresponding to the equipment type of the predetermined equipment.

In the first feature, the second controller calculates the second reference value for each operation condition of the plurality of equipments; and the second controller determines the occurrence or the non-occurrence of the error of the predetermined equipment based on a comparison result between the third measured value about the predetermined equipment and the second reference value corresponding to the equipment type and the predetermined operation conditions of the predetermined equipment, when the third measured value about the predetermined equipment is measured during an operation of the predetermined equipment according to the predetermined operation conditions.

In the first feature, the second controller calculates the second reference value for each operation condition of the plurality of equipments and for each installation environment of the plurality of equipments; and the second controller determines the occurrence or the non-occurrence of the error of the predetermined equipment based on a comparison result between the third measured value about the predetermined equipment and the second reference value corresponding to the equipment type, the predetermined operation conditions and a predetermined installation environment of the predetermined equipment, when the third measured value about the predetermined equipment is measured during an operation of the predetermined equipment according to the predetermined operation conditions and in the predetermined installation environment.

In the first feature, the second controller determines that the error has occurred in the predetermined equipment if a difference between the third measured value about the predetermined equipment and the second reference value corresponding to the equipment type of the predetermined equipment, the predetermined operation conditions, and the predetermined installation environment exceeds a threshold value, when the third measured value about the predetermined equipment is measured during an operation of the predetermined equipment according to the predetermined operation conditions and in the predetermined installation environment.

An equipment management apparatus according to a second feature manages equipment provided in a consumer's facility, includes a first controller that acquires a first measured value indicating an operation state of the equipment at predetermined timing, and a second measured value indicating an operation state of the equipment at timing prior to the predetermined timing, wherein the first controller calculates a first reference value indicating a standard of the operation state of the equipment using the second measured values; and the first controller determines an occurrence or a non-occurrence of an error of the equipment based on a comparison result between the first measured value and the first reference value.

An equipment management method according to a third feature is a method of an equipment management apparatus that manages equipment provided in a consumer's facility. The equipment management method includes the steps of acquiring a first measured value indicating an operation state of the equipment at predetermined timing, and a second measured value indicating an operation state of the equipment at timing prior to the predetermined timing; calculating a first reference value indicating a standard of an operation state of the equipment using the second measured value; and determining an occurrence or a non-occurrence of an error of the equipment based on a comparison result between the first measured value and the first reference value.

According to the present invention, provided are an equipment management system, an equipment management apparatus, and an equipment management method capable of detecting an error of equipment accurately.

DESCRIPTION OF EMBODIMENTS

Hereinafter, an equipment management system, an equipment management apparatus, and an equipment management method according to embodiments of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

[Outline of the Embodiments]

An equipment management system according to embodiment includes: an equipment management apparatus that manages equipment provided in a consumer's facility, wherein the equipment management apparatus comprises a first controller that acquires a first measured value indicating an operation state of the equipment at first timing and a second measured value indicating an operation state of the equipment at second timing prior to the first timing; the first controller calculates a first reference value indicating a standard of the operation state of the equipment using the second measured value; and the first controller determines an occurrence or a non-occurrence of an error of the equipment based on a comparison result between the first measured value and the first reference value.

The equipment management system according to the embodiment sets the first reference value calculated using the measured value indicating the operation state of the equipment to be basis during the determination of the occurrence or the non-occurrence of the error of the equipment. Thus, the equipment management system according to the embodiment is capable of detecting the error of the equipment accurately.

[Embodiments]

(Equipment Management System)

Figure 1:
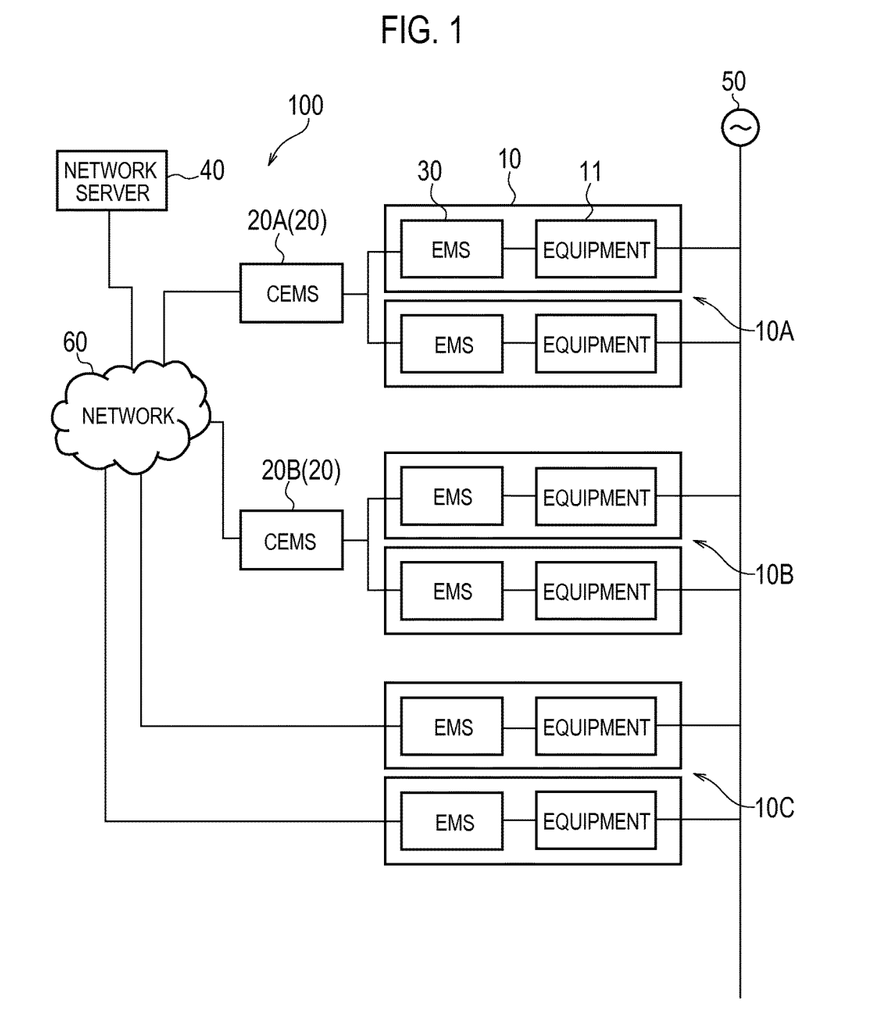
FIG. 1 is a diagram of an equipment management system according to the present embodiment.

Hereinafter, an equipment management system according to the present embodiment will be described. FIG. 1 is a diagram illustrating an equipment management system 100 according to the present embodiment.

As illustrated in FIG. 1, the equipment management system 100 includes a consumer's facility 10, a CEMS 20, and a network server 40. The consumer's facility 10 receives power supply from a grid 50. The consumer's facility 10, the CEMS 20, and the network server 40 are connected by a network 60.

In the present embodiment, the consumer's facility 10 includes an equipment 11 and an EMS 30. The equipment 11 includes distributed power sources that output generated or stored power, and loads that consume the power. The distributed power sources include, for example, fuel cell apparatuses, such as a photovoltaic power generation (PV) apparatus, a solid oxide fuel cell (SOFC), or a polymer electrolyte fuel cell (PEFC), and a storage battery apparatus. The loads include, for example, such apparatuses as a refrigerator, a freezer, a lighting, and an air conditioner. The EMS 30 is an exemplary equipment management apparatus that manages the equipment 11. One or a plurality of the equipment 11 may be provided. The configuration of the EMS 30 will be described later.

The consumer's facility 10 may be a detached house, a shop, such as a convenience store and a supermarket, a commercial facility, such as a commercial building, and a factory.

In the present embodiment, a consumer group 10A, a consumer group 10B, and a consumer group 10C are constituted by a plurality of consumer's facilities 10. The consumer group 10A, the consumer group 10B, and the consumer group 10C are classified, for example, geographically. The consumer group 10A, the consumer group 10B, and the consumer group 10C may, for example, be an apartment house, such as a condominium.

The CEMS 20 controls interconnection between a plurality of consumer's facilities 10 and the grid 50. The CEMS 20 manages a plurality of consumer's facilities 10 and is therefore referred to as a cluster/community energy management system (CEMS). In particular, the CEMS 20 disconnects a plurality of consumer's facilities 10 from the grid 50 during an outage or the like. On the other hand, the CEMS 20 interconnects a plurality of consumer's facilities 10 and the grid 50 during power recovery or the like.

In the present embodiment, a CEMS 20A and a CEMS 20B are provided as the CEMS 20. The CEMS 20A controls, for example, interconnection between the consumer's facilities 10 included in the consumer group 10A and the grid 50. The CEMS 20B controls, for example, interconnection between the consumer's facilities 10 included in the consumer group 10B and the grid 50. Since no CEMS is provided corresponding to the consumer group 10C in the present embodiment, the EMS 30, for example, provided in the consumer's facilities 10 included in the consumer group 10C controls interconnection between the consumer's facilities 10 and the grid 50.

The network server 40 collectively manages the consumer's facilities 10 included in the consumer group 10A, the consumer group 10B, and the consumer group 10C. The network server 40 stores information about the consumer's facilities 10 acquired, for example, from the CEMS 20 or a HEMS 30.

The grid 50 supplies power generated by a power plant to the consumer's facilities 10 via substations, power lines, and the like.

The network 60 is connected to each apparatus via signal lines. The network 60 is, for example, the Internet, a broadband communication network, a narrowband communication network, or a portable telephone network.

(Configuration of EMS)

Figure 2:
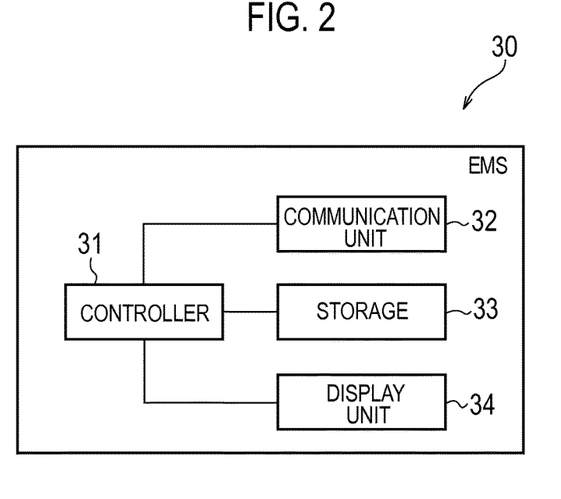
FIG. 2 is a block diagram of an EMS according to the present embodiment.
Figure 3:
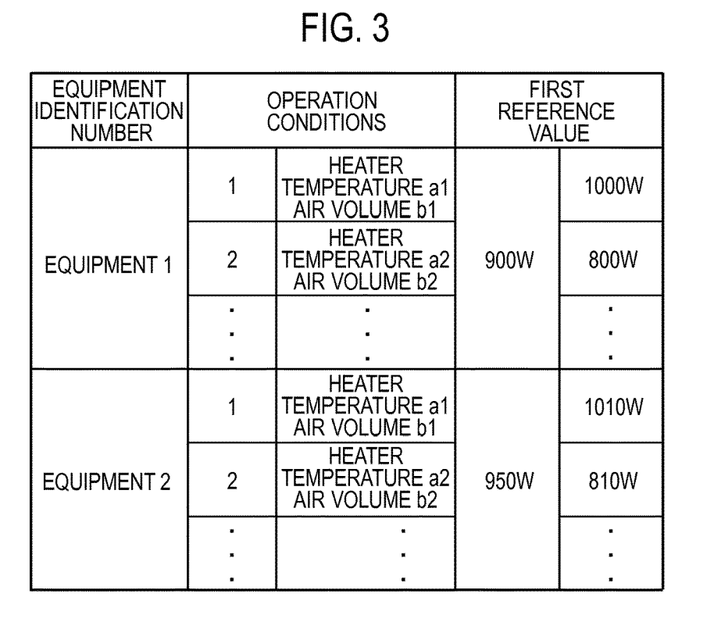
FIG. 3 is a diagram illustrating a table stored in a storage of the EMS according to the present embodiment.

Hereinafter, the EMS according to the present embodiment will be described. FIG. 2 is a block diagram of the EMS 30 according to the present embodiment. FIG. 3 is a diagram illustrating a table stored in a storage 33 of the EMS 30 according to the present embodiment.

As illustrated in FIG. 2, the EMS 30 includes a controller 31, a communication unit 32, the storage 33, and a display unit 34.

The controller 31 controls the communication unit 32, the storage 33, and the display unit 34.

In the present embodiment, the controller 31 acquires information about the equipment 11. The information about the equipment 11 includes, for example, an identification number of the equipment 11. The controller 31 may acquire information about the equipment 11 in a format based on communication protocols, such as the ECHONET Lite (registered trademark) or the Zig Bee (registered trademark), when the equipment 11 is connected to a new EMS 30 via a signal line. Alternatively, the controller 31 may request the equipment 11 to transmit information about the equipment 11.

In the present embodiment, the controller 31 acquires a measured value indicating an operation state of the equipment 11 (hereafter, a "measured value"). The measured value about the equipment 11 may, for example, be energy consumption (e.g., power consumption) of the equipment 11, or power generated or discharged by the equipment 11. The controller 31 may acquire the measured value from the equipment 11, or may acquire the measured value from, for example, a sensor provided separately from the equipment 11. The controller 31 may acquire the measured value about the equipment 11 periodically. Alternatively, the controller 31 may request the equipment 11 to transmit the measured value.

The communication unit 32 transmits and receives various signals to and from the equipment 11 via a signal line. In the present embodiment, the communication unit 32 receives information about the equipment 11. The controller 31 may control the equipment 11 using a signal based on communication protocols, such as the ECHONET Lite (registered trademark). The communication unit 32 may transmit information about the equipment 11 to the CEMS 20 via a signal line.

The storage 33 stores information about the equipment 11 acquired by the controller 31. When the controller 31 acquires the measured value about the equipment 11, the storage 33 stores the measured value acquired by the controller 31 together with the measured value acquired previously by the controller 31.

As illustrated in FIG. 3, the storage 33 has a table that stores information about the equipment 11. The storage 33 stores, for example, information about the equipment 11 (e.g., an identification number) and a later-described first reference value about the equipment 11 in association with each other.

The display unit 34 visualizes and displays various types of information stored in the EMS 30 by an application. The display unit 34 may include a manipulation unit, such as a touchscreen. In that case, a user may input information for controlling the equipment 11 via the manipulation unit.

(Determination About Occurrence or Non-Occurrence of Error)

Hereinafter, determination about an occurrence or a non-occurrence of an error of the equipment by the EMS according to the present embodiment will be described.

The controller 31 acquires a first measured value indicating an operation state of the equipment 11 at predetermined timing, and a second measured value indicating an operation state of the equipment 11 at timing prior to the predetermined timing. Specifically, the first measured value is one of the measured values about the equipment 11 and, preferably, is the latest measured value at the time of determining an occurrence or a non-occurrence of an error of the equipment 11. The second measured values are all the measured values about the equipment 11 acquired, for example, prior to the predetermined timing at which the first measured value is measured.

The controller 31 calculates a first reference value indicating a standard of the operation state of the equipment using the second measured values. Specifically, the controller 31 may calculate an average value of the second measured values, and use the calculated average value as the first reference value. Alternatively, after excluding values determined as outliers of the second measured values based on the average value, standard deviation, or the like, the controller 31 may calculate the average value of the second measured values and use the calculated average value as the first reference value. Alternatively, the controller 31 may classify the second measured values by time period, and calculate the first reference value for each time period. The storage 33 stores the first reference value in association with the information about the equipment 11.

The controller 31 may calculate the first reference value each time it acquires the measured value about the equipment 11. Alternatively, the controller 31 may calculate the first reference value periodically.

In the present embodiment, the controller 31 compares the first measured value with the first reference value. The controller 31 determines an occurrence or a non-occurrence of an error of the equipment 11 based on a comparison result between the first measured value and the first reference value. For example, the controller 31 determines that an error has occurred in the equipment 11 in a case where a difference between the measured value and the first reference value exceeds a threshold value.

If the controller 31 determines that an error has occurred in the equipment 11, the controller 31 may display a message notifying an occurrence of an error of the equipment 11 on the display unit 34. Alternatively, if the controller 31 determines that an error has occurred in the equipment 11, the controller 31 may transmit an equipment stop signal for stopping operation of the equipment 11 to the equipment 11 via the communication unit 32.

In the present embodiment, the controller 31 may acquire operation conditions (e.g., heating, temperature a1, an air volume b1, and the like) of the equipment 11 in addition to the measured value about the equipment 11. In that case, the storage 33 stores the measured value about the equipment 11 for each operation condition.

In a case where the controller 31 acquires the operation conditions of the equipment 11 in addition to the measured value about the equipment 11, the controller 31 calculates the first reference value for each operation condition. The storage 33 stores the first reference value in association with the information and the operation conditions about the equipment 11.

(Equipment Management Method)

Figure 4:
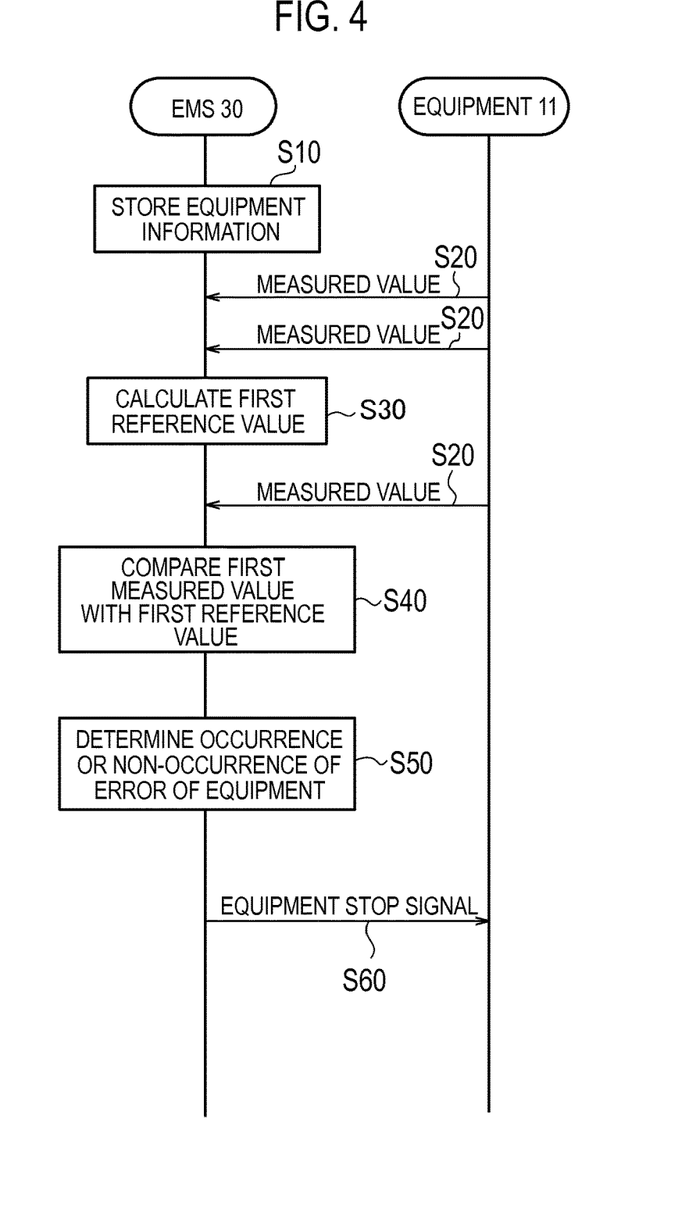
FIG. 4 is a sequence diagram of an equipment management method according to the present embodiment.

Hereinafter, an equipment management method according to the present embodiment will be described. FIG. 4 is a sequence diagram of the equipment management method according to the present embodiment.

In step S10, the EMS 30 stores information about the equipment 11 (e.g., the equipment type). Here, the information about the equipment 11 may be transmitted to the EMS 30 from the equipment 11 when the equipment 11 is newly connected to the EMS 30 via a signal line. Alternatively, the EMS 30 may request the equipment 11 to transmit the information about the equipment.

In step S20, the EMS 30 acquires the measured value about the equipment 11 and stores the acquired measured value. Here, the EMS 30 may acquire the measured value from the equipment 11, or may acquire the measured value from a sensor or the like provided separately from the equipment 11. The EMS 30 may perform the process of step S20 periodically (e.g., each one minute), or may perform the process of step S20 when the EMS 30 requests the equipment 11 to transmit the measured value.

In step S30, the EMS 30 calculates the first reference value. Specifically, the EMS 30 refers to the stored measured value, and sets a measured value indicating the operation state of the equipment 11 at predetermined timing to be the first measured value, and sets a of measured values representing the operation state of the equipment 11 at timing prior to the predetermined timing to be the second measured value. The EMS 30 calculates the first reference value indicating the standard of the operation state of the equipment using the second measured value. The process of step S30 may be performed in succession to step S20 or may be performed periodically (e.g., each 15 minutes).

In step S40, the EMS 30 compares the first measured value with the first reference value. In step S50, the EMS 30 determines an occurrence or a non-occurrence of an error of the equipment 11 based on a comparison result between the first measured value and the first reference value. In a case where the EMS 30 determines that an error has occurred in the equipment 11, the EMS 30 performs the process of step S60.

In step S60, the EMS 30 transmits, for example, an equipment stop signal for stopping the equipment 11 to the equipment 11. Alternatively, the EMS 30 may display a message notifying a user of an occurrence of an error of the equipment 11.

Here, in step S20, in a case where the EMS 30 acquires the operation conditions in addition to the measured value about the equipment 11, the EMS 30 stores the measured value about the equipment 11 for each operation condition. In step S30, the EMS 30 calculates the first reference value about the equipment 11 for each operation condition.

As described above, the EMS 30 calculates the first reference value using the measured value about the equipment 11. The EMS 30 updates the first reference value by repeating the process of step S20. Therefore, since the EMS 30 uses the first reference value suitable to the usage status of the equipment 11 for the determination of an occurrence or a non-occurrence of an error, the EMS 30 can detect an error of the equipment 11 accurately.

[First Modification]

Figure 5:
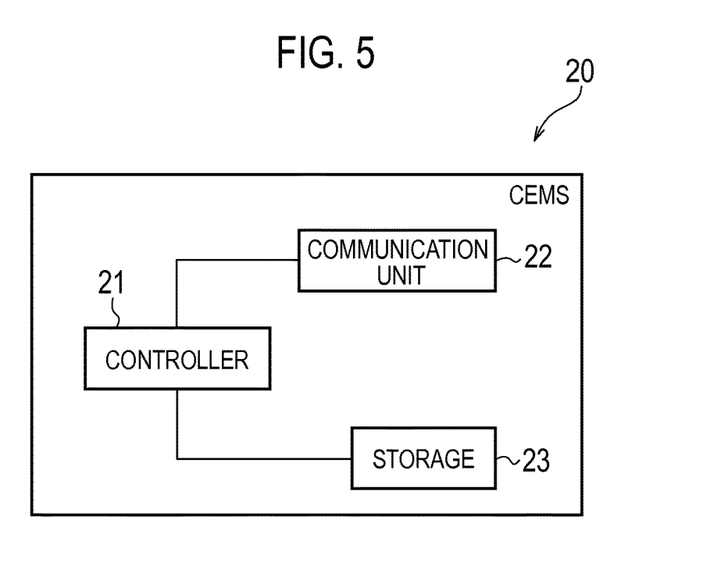
FIG. 5 is a block diagram of a CEMS according to a first modification.
Figure 6:
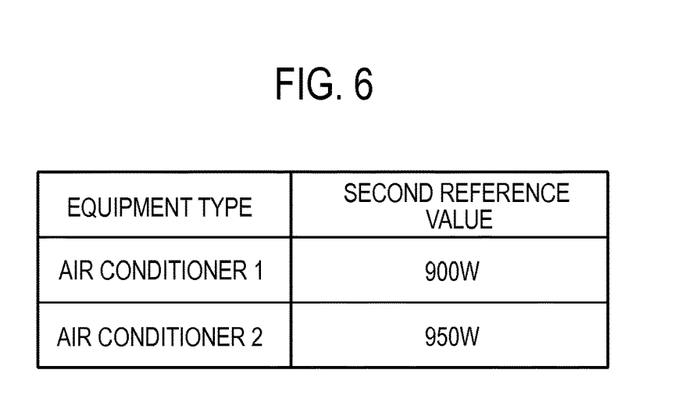
FIG. 6 is a diagram illustrating a table stored in a storage of the CEMS according to the first modification.
Figure 7:
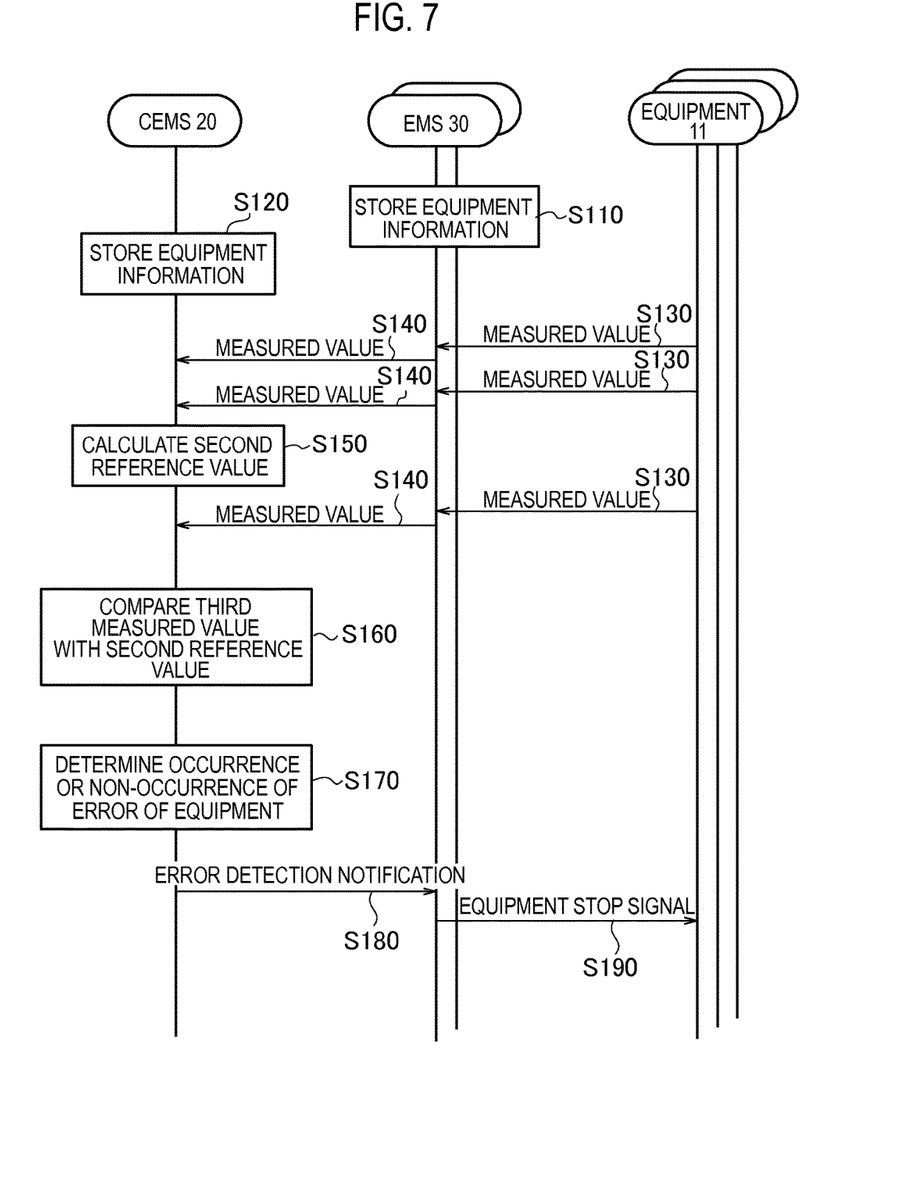
FIG. 7 is a sequence diagram of an equipment management method according to the first modification.

Hereinafter, an equipment management system according to a first modification of the present embodiment will be described mainly with reference to differences from the equipment management system according to the present embodiment. FIG. 5 is a block diagram illustrating a CEMS 20 according to the first modification. FIG. 6 is a diagram illustrating a table stored in a storage 23 of the CEMS 20 according to the first modification. FIG. 7 is a sequence diagram of the equipment management method according to the first modification.

As illustrated in FIG. 5, the CEMS 20 includes a controller 21, a communication unit 22, and a storage 23.

The controller 21 controls the communication unit 22 and the storage 23.

In the first modification, the controller 21 acquires information about each of a plurality of equipments 11 managed by any of a plurality of EMSs 30 (hereinafter, referred to as "equipment 11"). Information about the equipment 11 includes the equipment type (e.g., an air conditioner 1).

In the first modification, the controller 21 acquires a measured value indicating an operation state about the equipment 11 managed by any of a plurality of EMSs 30. Specifically, the controller 21 acquires a third measured value indicating the operation state about the equipment 11 at predetermined timing, and a fourth measured value indicating the operation state acquired at timing prior to the predetermined timing. The third measured value is one of the measured values about the equipment 11 and, preferably, is the latest measured value at the time of determining an occurrence or a non-occurrence of an error of the equipment 11. The fourth measured values are, for example, all the measured values about the equipment 11 acquired prior to the predetermined timing at which the third measured value is measured.

The communication unit 22 transmits and receives various signals to and from the EMS 30 via a signal line. In the present embodiment, the communication unit 22 receives information about the equipment 11 from the EMS 30. The communication unit 22 may transmit and receive various signals to and from the network server 40 via the network 60.

The storage 23 stores the measured value about the equipment 11 acquired by the controller 21. That is, when the controller 21 acquires the measured value about the equipment 11, the storage 23 stores the measured value acquired by the controller 21 in addition to the measured value acquired previously by the controller 21.

As illustrated in FIG. 6, the storage 23 includes a table that stores information about the equipment 11. The storage 23 stores the equipment type of the equipment 11 and a later-described second reference value about the equipment 11 in association with each other.

In the first modification, the controller 21 calculates the second reference value indicating the standard of the operation state for each equipment type of a plurality of equipments using the fourth measured value regarding the equipment of the same equipment type among a plurality of equipments. The storage 23 stores the second reference value about the equipment 11 in association with the equipment type of the equipment 11.

In the first modification, the controller 21 determines an occurrence or a non-occurrence of an error of predetermined equipment (i.e., the equipment 11) based on a comparison result between the third measured value about the predetermined equipment included in a plurality of equipments and the second reference value corresponding to the equipment type of the predetermined equipment. For example, the controller 31 determines that an error has occurred in the equipment 11 if a difference between the third measured value and the second reference value exceeds a threshold value. In a case where the controller 21 determines that an error has occurred in the equipment 11, the controller 21 notifies the EMS 30 of the error of the equipment 11.

Hereinafter, an equipment management method according to the first modification of the present embodiment will be described. FIG. 7 is a sequence diagram of the equipment management method according to the first modification.

In step S110, the EMS 30 stores information about the equipment 11. Next, in step S120, the CEMS 20 stores information about the equipment 11. The process of step S120 is performed in succession to, for example, the process of step S110.

In step S130, the EMS 30 acquires the measured value about the equipment 11 and stores the acquired measured value. Next, in step S140, the CEMS 20 acquires the measured value about the equipment 11 and stores the acquired measured value. The process of step S140 is performed in succession to, for example, the process of step S130.

In step S150, the CEMS 20 calculates the second reference value. Specifically, with reference to the stored measured value, the CEMS 20 sets the measured value indicating the operation state at predetermined timing to be the third measured value, and sets a measured value indicating the operation state at timing prior to the predetermined timing to be the fourth measured value, regarding the equipment 11 managed by any of a plurality of EMSs 30. The CEMS 20 calculates the second reference value indicating the standard of the operation state for each equipment type of a plurality of equipments using the fourth measured value regarding the equipment of the same equipment type among a plurality of equipments. The process of step S150 may be performed in succession to step S140 or may be performed periodically (e.g., each 15 minutes).

In step S160, the CEMS 20 compares the third measured value about predetermined equipment included in a plurality of equipments and the second reference value corresponding to the equipment type of the predetermined equipment. In step S170, the CEMS 20 determines an occurrence or a non-occurrence of an error of the predetermined equipment based on the comparison result in step S160. In a case where the CEMS 20 determines that an error has occurred in the predetermined equipment, the CEMS 20 performs the process of step S180.

In step S180, the CEMS 20 transmits an error detection notification about the predetermined equipment to the EMS 30 that manages the predetermined equipment. The EMS 30 that has received the error detection notification transmits, for example, an equipment stop signal for stopping the equipment 11 to the predetermined equipment in step S190. Alternatively, the EMS 30 may display a message notifying a user of an occurrence of an error about the predetermined equipment.

As described above, in the equipment management system according to the first modification of the present embodiment, the CEMS 20 acquires, from a plurality of EMSs 30, the measured value about the equipment 11 managed by each EMS 30. The CEMS 20 calculates the second reference value for each equipment type and uses the calculated second reference value for the determination of an occurrence or a non-occurrence of an error of the equipment 11.

The CEMS 20 calculates the second reference value for each equipment type using the measured value about the equipment 11 acquired from a plurality of EMSs 30. As described above, the consumer group managed by the CEMS 20 (e.g., the consumer group 10A and the consumer group 10B) is, for example, a geographically divided consumer group or an apartment house, such as a condominium. Therefore, it is supposed that the equipments 11 provided in a consumer group managed by the same CEMS 20 are installed in similar installation environments (e.g., an average temperature or a building structure) even if the equipments 11 are managed by different EMSs 30. Thus, the CEMS 20 calculates the second reference value using many measured values about the equipments installed in similar installation environments and of the same equipment type. Since the CEMS 20 uses the thus-calculated second reference value as the base at the time of determining an occurrence or a non-occurrence of an error of the equipment 11, the CEMS 20 can determine an error of the equipment 11 accurately.

[Second Modification]

Figure 8:
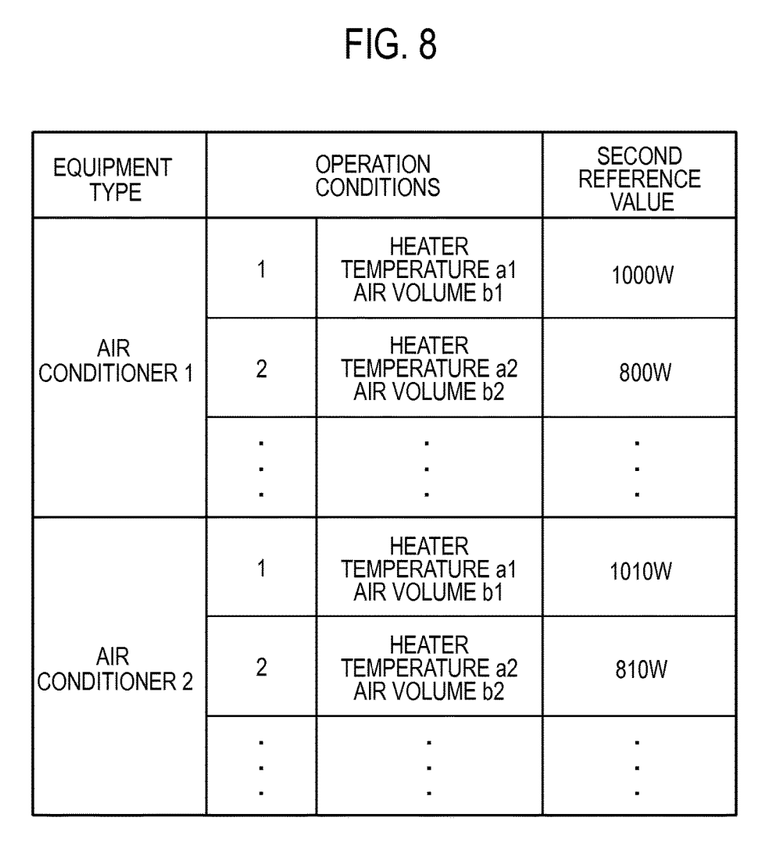
FIG. 8 is a diagram illustrating a table stored in a storage of a CEMS according to a second modification.

Hereinafter, an equipment management system according to a second modification of the present embodiment will be described mainly with reference to differences from the equipment management system according to the first modification of the present embodiment. FIG. 8 is a diagram illustrating a table stored in a storage 23 of the CEMS 20 according to the second modification. Since the configuration of the CEMS 20 according to the second modification is common to that of the CEMS 20 according to the first modification illustrated in FIG. 5, description thereof will be omitted.

In the second modification, the controller 21 acquires operation conditions (e.g., heating, temperature a1, and an air volume b1) of the equipment 11 in addition to the measured value about the equipment 11.

The storage 23 stores the measured value about the equipment 11 acquired by the controller 21. In the second modification, the storage 23 stores the measured value about the equipment 11 for each equipment type and each operation condition of the equipment 11.

As illustrated in FIG. 8, the storage 23 includes a table that stores information about the equipment 11. The storage 23 stores the equipment type and the operation conditions of the equipment 11, and the second reference value in association with each other.

In the second modification, the controller 21 calculates the second reference value for each of the operation conditions of a plurality of equipments. The storage 23 stores the second reference value about the equipment 11 in association with the equipment type and the operation condition of the equipment 11.

In the second modification, when a third measured value about the predetermined equipment is measured during an operation of the predetermined equipment according to predetermined operation conditions, the controller 21 determines an occurrence or a non-occurrence of an error of the predetermined equipment based on a comparison result between the third measured value about the predetermined equipment and the second reference value corresponding to the equipment type and the predetermined operation conditions of the predetermined equipment.

As described above, in the equipment management system according to the second modification of the present embodiment, the CEMS 20 calculates the second reference value using the operation conditions in addition to the equipment type of the equipment 11. Thus, the CEMS 20 calculates the second reference value in a manner more suitable to the usage status of the equipment 11. Since the CEMS 20 uses the thus-calculated second reference value as the base at the time of determining an occurrence or a non-occurrence of an error of the equipment 11, the CEMS 20 can determine an error of the equipment 11 accurately.

[Third Modification]

Figure 9:
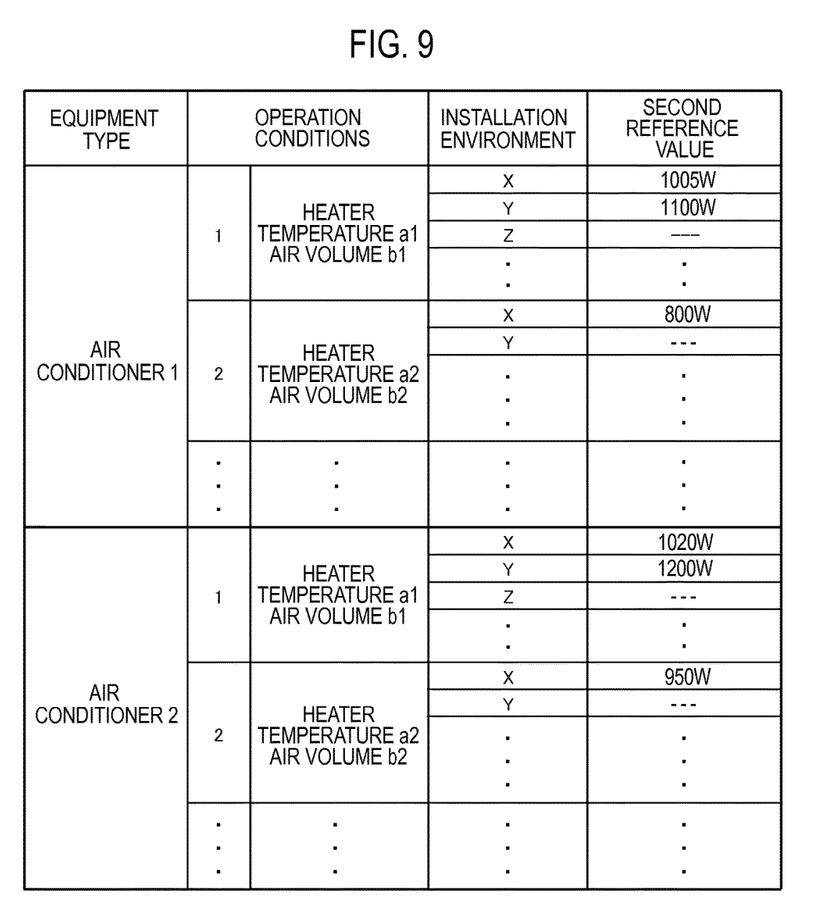
FIG. 9 is a diagram illustrating a table stored in a storage of a CEMS according to the third modification.

Hereinafter, an equipment management system according to a third modification of the present embodiment will be described mainly with reference to differences from the equipment management system according to the second modification of the present embodiment. FIG. 9 is a diagram illustrating a table stored in a storage 23 of the CEMS 20 according to the third modification. Since the configuration of the CEMS 20 according to the third modification is common to that of the CEMS according to the first modification illustrated in FIG. 5, description thereof will be omitted.

In the third modification, the controller 21 acquires information about the equipment 11. Information about the equipment 11 includes the equipment type and the installation environment (e.g., reinforced concrete construction) of the equipment 11.

In the third modification, the storage 23 stores the measured value about the equipment 11 for each equipment type, each operation condition, and each installation environment of the equipment 11.

As illustrated in FIG. 9, the storage 23 includes a table that stores information about the equipment 11. The storage 23 stores the equipment type, the operation conditions and the installation environment of the equipment 11, and the second reference value in association with each other.

In the third modification, the controller 21 calculates the second reference value for each of the operation conditions and each installation environment of a plurality of equipments. The storage 23 stores the second reference value about the equipment 11 in association with the equipment type, the operation conditions, and the installation environment of the equipment 11.

In the third modification, the controller 21 determines an occurrence or a non-occurrence of an error of the predetermined equipment based on a comparison result between the third measured value about the predetermined equipment and the second reference value corresponding to the equipment type, the predetermined operation conditions and the predetermined installation environment of the predetermined equipment, when a third measured value about the predetermined equipment is measured during an operation of the predetermined equipment according to predetermined operation conditions and in a predetermined installation environment.

As described above, in the equipment management system according to the third modification of the present embodiment, the CEMS 20 calculates the second reference value using the installation environment in addition to the equipment type and the operation conditions of the equipment 11. Thus, the CEMS 20 calculates the second reference value in a manner more suitable to the usage status of the equipment 11. Since the CEMS 20 uses the thus-calculated second reference value as the base at the time of determining an occurrence or a non-occurrence of an error of the equipment 11, the CEMS 20 can determine an error of the equipment 11 accurately.

[Other Embodiment]

Although the present invention has been described with reference to the embodiments described above, it should not be understood that the discussion and drawings constituting a part of the disclosure are limiting the present invention. Various alternative embodiments, examples and operation technology will be apparent to a person skilled in the art from the present disclosure.

The EMS 30 may also be a home energy management system (HEMS), a store energy management system (SEMS), a building energy management system (BEMS), or a factory energy management system (FEMS).

In the present embodiment, the EMS 30 calculates the first reference value using the measured value (and the operation conditions) about the equipment 11. For example, in a case where the EMS 30 manages a plurality of equipments of the same equipment type, the EMS 30 may calculate the second reference value indicating the standard of the operation state for each equipment type and may determine an occurrence or a non-occurrence of an error of the equipment 11.

In the present embodiment, the CEMS 20 calculates the second reference value using the information, the measured values, and the like about the equipment 11, and determines an occurrence or a non-occurrence of an error of the equipment 11. Alternatively, the network server 40 may calculate the second reference value using the information, the measured values, and the like about the equipment 11, and determine an occurrence or a non-occurrence of an error of the equipment 11.

Thus, it is a matter of course that the present invention includes a variety of embodiments or the like that are not described herein. Also, the foregoing embodiments and modification examples can be combined. Therefore, the technical scope of the present invention is defined only by specific matters of the invention according to the scope of the claim that is reasonable from the foregoing description.

It is noted that the entire content of Japanese Patent Application No. 2013-014476 (filed on Jan. 29, 2013) is incorporated in the present specification by reference.

INDUSTRIAL APPLICABILITY

According to the present invention, provided are the equipment management system, the equipment management apparatus, and the equipment management method capable of detecting the error of equipment accurately.

The invention claimed is:

1. An equipment management system comprising:
a plurality of equipment management apparatuses respectively provided for a plurality of facilities, and
a higher-order management apparatus that manages the plurality of equipment management apparatuses, wherein
- a target management apparatus transmits, to the higher-order management apparatus, a first measured value indicating an operation state of a target equipment managed by the target management apparatus at first timing, the target management apparatus being any one of the plurality of equipment management apparatuses,
- a reference management apparatus transmits, to the higher-order management apparatus, a second measured value indicating an operation state of a reference equipment managed by the reference management apparatus at second timing prior to the first timing, the reference management apparatus being any one or more of the plurality of equipment management apparatuses and provided for a facility having a building structure same with a facility for which the target management apparatus is provided,
- the higher-order management apparatus
  - acquires the first measured value and the second measured value,
  - calculates a first reference value indicating a standard of the operation state of an equipment using the second measured value, and
  - determines an occurrence or a non-occurrence of an error of the target equipment based on a comparison result between the first measured value and the first reference value, and
- the target management apparatus controls the operation state of the target equipment based on the occurrence or the non-occurrence of the error.

2. The equipment management system according to claim 1, wherein the higher-order management apparatus calculates the first reference values for each of operation conditions of the equipment, and determines the occurrence or the non-occurrence of the error of the target equipment for each of the operation conditions of the equipment.

3. The equipment management system according to claim 1, wherein the higher-order management apparatus calculates the first reference value for each types of the equipment, and determines the occurrence or the non-occurrence of the error of the target equipment for each of the types of the equipment.

4. An equipment management method used in an equipment management comprising a plurality of equipment management apparatuses respectively provided for a plurality of facilities and a higher-order management apparatus that manages the plurality of equipment management apparatuses, the equipment management method comprising:
- transmitting from a target management apparatus to the higher-order management apparatus, a first measured value indicating an operation state of a target equipment managed by the target management apparatus at first timing, the target management apparatus being any one of the plurality of equipment management apparatuses,
- transmitting from a reference management apparatus to the higher-order management apparatus, a second measured value indicating an operation state of a reference equipment managed by the reference management apparatus at second timing prior to the first timing, the reference management apparatus being any one or more of the plurality of equipment management apparatuses and provided for a facility having a building structure same with a facility for which the target management apparatus is provided,
- calculating, at the higher-order management apparatus, a first reference value indicating a standard of an operation state of an equipment using the second measured value,
- determining, at the higher-order management apparatus, an occurrence or a non-occurrence of an error of the target equipment based on a comparison result between the first measured value and the first reference value, and
- controlling, by the target management apparatus, the operation state of the target equipment based on the occurrence or the non-occurrence of the error.

* * * * *